US008874865B2

(12) United States Patent
Bates et al.

(10) Patent No.: US 8,874,865 B2
(45) Date of Patent: Oct. 28, 2014

(54) MEMORY TYPE-SPECIFIC ACCESS CONTROL OF A FIELD OF A RECORD

(75) Inventors: Cary L. Bates, Rochester, MN (US); Nicholas P. Johnson, Rochester, MN (US); Justin K. King, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 13/228,953

(22) Filed: Sep. 9, 2011

(65) Prior Publication Data

US 2013/0067155 A1 Mar. 14, 2013

(51) Int. Cl.
*G06F 12/14* (2006.01)
*G06F 9/44* (2006.01)

(52) U.S. Cl.
CPC ........................................ *G06F 8/00* (2013.01)
USPC ........................................... 711/163; 711/104

(58) Field of Classification Search
USPC ................................................ 711/104, 163
See application file for complete search history.

(56) References Cited

U.S. PATENT DOCUMENTS

| 5,166,758 | A | 11/1992 | Ovshinsky et al. | |
|---|---|---|---|---|
| 2009/0307442 | A1 | 12/2009 | Singh | |
| 2012/0170359 | A1 * | 7/2012 | Wu et al. | 365/163 |
| 2013/0061007 | A1 * | 3/2013 | Bates et al. | 711/154 |
| 2013/0290597 | A1 * | 10/2013 | Faber | 711/102 |

OTHER PUBLICATIONS

Basten et al., "Thermal-Aware Scratchpad Memory Design and Allocation," *2010 IEEE International Conference on Computer Design(ICCD)*, Oct. 3, 2010, pp. 1-7, Digital Object Identifier: 10.1109/ICCD.2010.5647616, The Netherlands.
Kim et al.; "Temperature-Aware Compilation for VLIW Processors," *13th IEEE Conference on Embedded and Real-time Computing Systems and Applications (RTCSA 2007)*, pp. 426-431, Aug. 2007, Korea.
Atienza et al., "Thermal-Aware Data Flow Analysis," *Design Automation Conference, 2009(DAC '09. 46th ACM/IEEE*, Jul. 2009, pp. 613-614, San Francisco, California, USA.
Atienza et al., "Thermal-Aware Compilation for System-On-Chip Processing Architectures," *Proceedings of the 20th Symposium on Great Lakes Symposium on VLSI*, Digital Object Identifier: 10.1145/1785481.1785535, May 2010, pp. 221-226, Providence, Rhode Island, USA.
Orailoglu et al., "Processor Reliability Enhancement Through Compiler-Directed Register File Peak Temperature Reduction," *IEEE/IFIP International Conference on Dependable Systems & Networks, 2009. DSN '09*, Digital Object Identifier: 10.1109/DSN.2009.5270305, Jun. 2009, pp. 468-477, Portugal.

* cited by examiner

*Primary Examiner* — Kenneth Lo
(74) *Attorney, Agent, or Firm* — Biggers Kennedy Lenart Spraggins, LLP

(57) ABSTRACT

A computing system includes computer memory of a number of different memory types. An application program compiled for execution on the computing system controls access to a field of a record in the computer memory of the computing system by defining a record that includes one or more fields, the one or more fields including a restricted field having a specification of restricted accessibility when the restricted field is allocated in a particular memory type; allocating an instance of the record in memory of the particular memory type; and denying each attempted access of the restricted field while the record is allocated in the particular memory type.

19 Claims, 3 Drawing Sheets

MEMORY TYPE-SPECIFIC ACCESS CONTROL OF A FIELD OF A RECORD

BACKGROUND OF THE INVENTION

1. Field of the Invention

The field of the invention is data processing, or, more specifically, methods, apparatus, and products for memory type-specific access control of a field of a record.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer software has become sophisticated, in fact, that often multiple developers or multiple teams of developers are tasked with developing different portions of a single application. From time to time, one developer responsible for one portion of code may want to restrict other portions of code—code developed by other developers—from accessing fields of a record.

SUMMARY OF THE INVENTION

Methods, apparatus, and products for access control of a field of a record in computer memory of a computing system are disclosed. In the computing system, the computer includes a number of disparate memory types. In embodiments of the present invention, access control is carried out by: defining, by an application, a record, where the record includes one or more fields, at least one of which is a restricted field having a specification of restricted accessibility when the restricted field is allocated in a particular memory type. The application then allocates an instance of the record in memory of the particular memory type and, while the record is allocated in the particular memory type, the application denies each attempted access of the restricted field.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
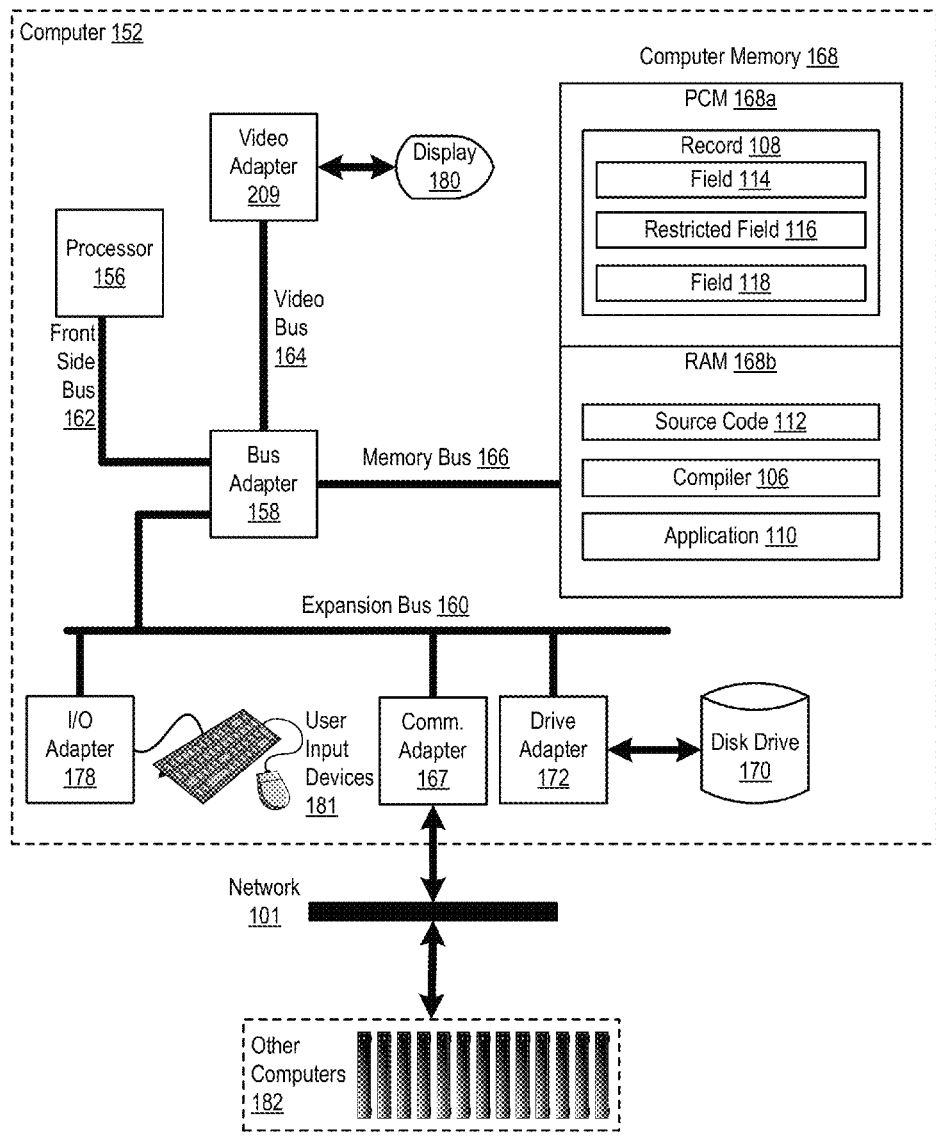
FIG. 1 sets forth a block of a system for access control of a field of a record in computer memory according to embodiments of the present invention.

Exemplary methods, apparatus, and products for access control of a field of a record in computer memory in accordance with the present invention are described with reference to the accompanying drawings, beginning with FIG. 1. FIG. 1 sets forth a block of a system for access control of a field of a record in computer memory according to embodiments of the present invention. The system of FIG. 1 includes an exemplary computer (152) that, in turn, includes at least one computer processor (156) or 'CPU' as well as computer memory (168) formed of disparate, that is different, memory types. In the example of FIG. 1, the computer memory (168) includes random access memory (168*b*) ('RAM') and Phase Change Memory (PCM) (168*a*). The computer memory (168) is connected through a high speed memory bus (166) and bus adapter (158) to processor (156) and to other components of the computer (152).

PCM is a type of non-volatile, addressable computer memory. PCM exploits the unique behavior of chalcogenide glass. With the application of heat produced by the passage of an electric current, this material can be "switched" between two states, crystalline and amorphous. Recent versions can achieve two additional distinct states, effectively doubling PCM storage capacity.

Stored in RAM (168*b*) is a compiler (106), a module of computer program instructions that transforms source code (112) written in a programming language (the source language) into another computer language (the target language, often having a binary form known as object code). The most common task executed by a compiler is transformation of source code into an executable application (110).

In the example of FIG. 1, the compiler (106) is also configured to compile source code configured for access control of a field of a record in computer memory according to embodiments of the present invention. A 'record' as the term is used in this specification refers to data structure that contains other values, typically in fixed number and sequence and typically indexed by names or identifiers. The elements of records are sometimes referred to as fields or members. Examples of a record include a 'struct' or a 'union' as used in a C-type programming language and a class or object in a C++ type programming language. A struct is a structured type that aggregates a fixed set of labeled objects—elements or fields—which may be of different types, into a single object. A union is a data structure that consists of a variable that may have any one of several types (representations or formats). Like a struct, a union is declared with one or more records, where each record may be of a different type. An instance of a union, unlike a struct, may take the type of only one of the records at a time. Once defined one or more separate instances of a record may be allocated in memory (168).

The compiler (106) supports compiling the source code (112) into an application with access control of a field of a record by, during compilation of the source code into an executable application: determining, for each access of a field of a record, whether the field was defined as having a specification of restricted accessibility when the field is allocated in a particular memory type. An access of a field of a record may be implemented in a variety of ways including, as one example, storing a value in the field.

The example source code (112) of FIG. 1 may include a definition of a record in which a field of the record is specified as having restricted accessibility when the field is allocated in a particular memory type. Consider, for example, the following pseudo-code defining a struct and declaring a data type of that struct:

```
typedef struct X
{
    NoAccess_PCM int Y;
    int K;
} Z;
```

In the above example pseudo-code, Z is declared as a data type for the struct X. Struct X includes two elements, an integer Y and an integer K. The integer Y is specified as having restricted accessibility when the field is allocated in PCM by the descriptor "NoAccess_PCM." Readers of skill in the art will recognize that this descriptor is but one way among many possible ways of specifying a memory-type access restriction in a definition of a record. Another way, for example, may be to declare an element of the struct with a particular type such as NoAccess_PCM_int, effectively combining the access restriction specification and the type of the element.

For each access of a field in the source code (112), then the compiler (106) may determine whether the field was defined as having a specification of restricted accessibility when the field is allocated in a particular memory type by investigating the definition of the record and the field within the record. If the field was not defined as having a specification of restricted accessibility, the compiler (106) may continue compiling normally. If the field was defined as having a specification of restricted accessibility when the field is allocated in the particular memory type and when all allocations in the source code (112) of the field are allocations in the restricted memory type, the compiler (106) may generate an error indicating one or more attempted accesses of a restricted field.

In the example source code of FIG. 1, a record may be allocated in a normal fashion—with a system-level function call to malloc, for example—or in a memory-type specific fashion. A function such as, mallocPCM, for example may be implemented at the operating system and made available to applications to call for memory-specific memory allocation. If every allocation in the source code (112) in the example of FIG. 1 of a restricted field is a memory-specific allocation to the particular memory type from within which access of the field is restricted, any attempted access to that field is necessarily an attempted access to the field while the field is allocated in the particular memory type.

If less than every, but at least one, allocation of the restricted field is an allocation in the restricted memory type, the compiler any access to the restricted field is suspect. Such a case is described here as a 'mixed' case in which a restricted field is allocated at one time in restricted memory and at another in non-restricted memory. In the mixed case, the compiler (106) is unable to determine at compile time whether the restricted field will be allocated in restricted memory at run time. Consider, for example the following pseudo-code:

```
typedef struct X
{
    NoAccess_PCM int Y;
    int K;
} Z;
Z *p;
If(Q = 1)
{
    p = mallocPCM(sizeof (Z));
```

-continued

```
}
else
{
    p = malloc (sizeof (Z));
}
```

In the above example pseudo-code, a pointer p is declared having a type Z, the example struct type explained above in which the field Y has a specification of access restriction when allocated in PCM. The pseudo-code also includes two different allocations of p, one in PCM and one non-memory-type specific allocation. The allocation of p in PCM occurs when a condition, Q=1, is satisfied, while the non-memory-type specific allocation occurs in all other instances. In this example, the compiler (106) at compile time cannot determine whether p will be allocated in PCM upon an access of p.

Rather than generating an error for the mixed case, a compiler instead may generate computer program instructions in the application that execute upon each attempted access of the field, which determine whether the field is currently allocated in the particular memory type (the restricted memory type) and deny access to the field if the field is currently allocated in the particular memory type. That is, the compiler may generate and insert run-time code immediately prior to each access of the restricted field.

If the compiler (106) determines that the restricted field is never allocated in restricted memory, the compiler (106) may continue compiling the source code (112) in a normal manner.

Once compiled, the application (110) is configured for access control of a field of a record in computer memory in accordance with embodiments of the present invention. The application (110) may define a record (108), where the record (108) includes one or more fields (114, 116, and 118). At least one of the fields (114, 116, and 118) is a restricted field (116) having a specification of restricted accessibility when the restricted field is allocated in a particular memory type (168a). The application may then allocate an instance of the record (108) in memory of the particular memory type (168a). Allocating an instance of the record (108) in memory of the particular memory type (168) may include executing, for each field of the record, a function call to allocate the field in memory, where the function call to allocate the restricted field (116) is a memory type-specific function call such as, for example, mallocPCM.

Once allocated, the application (110) may deny each attempted access of the restricted field (116) while the record is allocated in the particular memory type. Denying each attempted access of the restricted field may include returning an error upon an instruction's attempt to access the field, halting execution of the application, notifying a user of the denial, and so on as will occur to readers of skill in the art.

Also stored in RAM (168b) is an operating system (154). Examples of operating systems that may be configured to support memory type-specific access control of a field of a record according to embodiments of the present invention include UNIX™, Linux™, Microsoft XP™, AIX™, IBM's i5/OS™, and others as will occur to those of skill in the art. The operating system (154), source code (112), and application in the example of FIG. 1 are shown in RAM (168b), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that support memory type-specific access control of a field of a record according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support memory type-specific access control of a field of a record according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
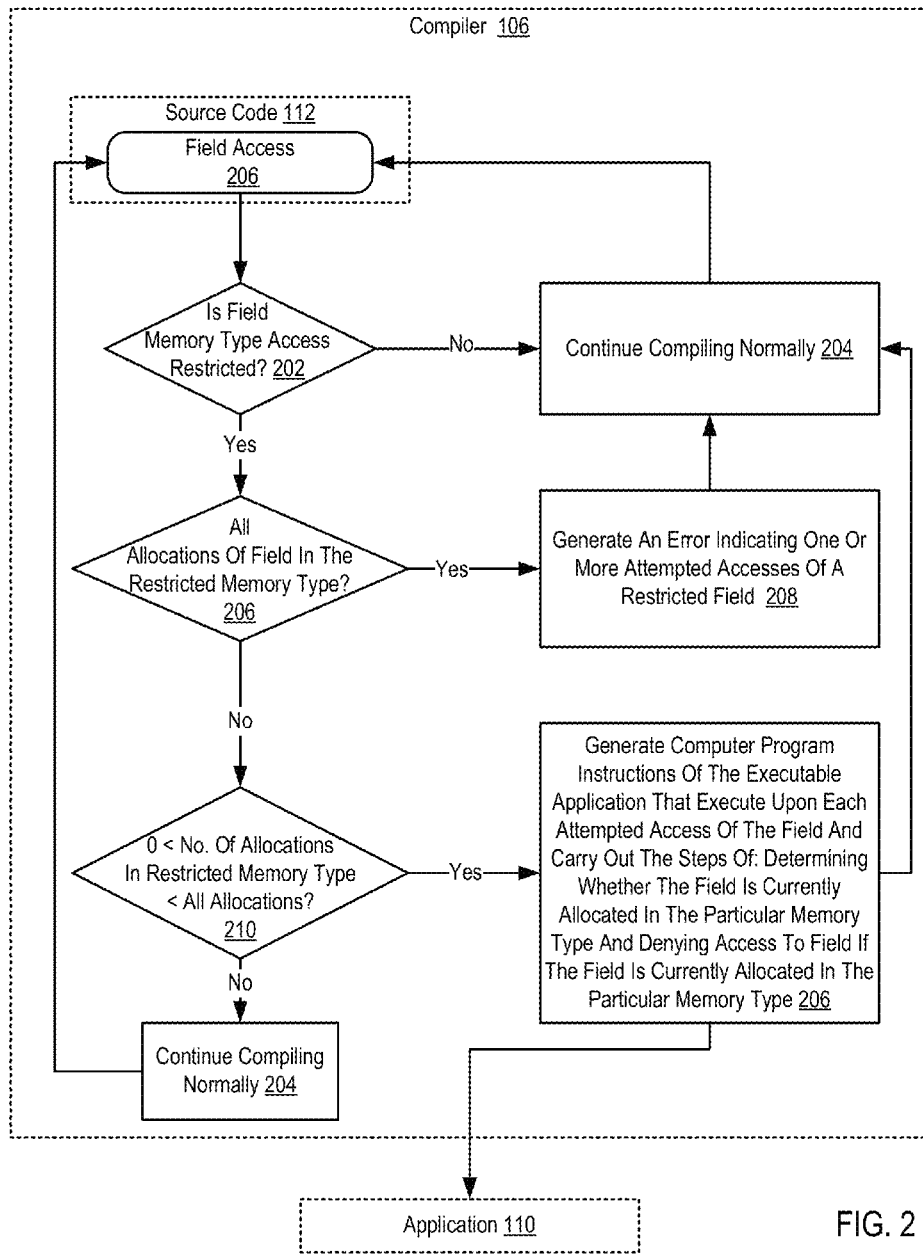
FIG. 2 sets forth a flow chart illustrating an exemplary method for compiling source code configured for access control of a field of a record in computer memory.

For further explanation, FIG. 2 sets forth a flow chart illustrating an exemplary method for compiling source code configured for access control of a field of a record in computer memory. The method of FIG. 2 is carried out by a compiler (106) during compilation of source code (112) into an executable application (110). The source code (112) is compiled for a computing system that includes computer memory of a number of disparate memory types. The computer memory may be implemented as one or more modules of persistent non-volatile, addressable memory, such as PCM, and one or more modules of volatile RAM.

The method of FIG. 2 includes determining (202), for each access (206) of a field of a record, whether the field was defined as having a specification of restricted accessibility when the field is allocated in a particular memory type. Determining (202) whether the field was defined as having a specification of restricted accessibility may be carried out in various ways including, for example, searching the source code for a definition of the record and field and determining whether the field's definition includes such a specification.

If the field was not defined as having a specification of restricted accessibility, the method of FIG. 2 continues (204) compiling the source code (112) normally, until encountering another access (206) of a field of a record. If the field was defined as having a specification of restricted accessibility when the field is allocated in the particular memory type, the method of FIG. 2 continues by determining (206) whether all allocations in the source code of the field are allocated in the restricted memory type. Each allocation in the source code (112) in the example of FIG. 2 may effected with a memory-type specific system-level function call, such as mallocPCM for example, or may be non-memory-type specific system-level function call, such as malloc. To determine (206) whether allocations in the source code (112) of the field are allocated in the restricted memory type, the compiler (106) may search the source for each allocation, to determine whether the memory-type specific function call was used to allocate the field in memory.

If all allocations in the source code (112) of the field are allocations in the restricted memory type, the method of FIG. 2 continues by generating (208) an error indicating one or more attempted accesses of a restricted field. The error may take the form of other compiler errors in a listing of errors provided to a user upon completion of the compilation of source code. In this example, after generating the error, the compiler continues (204) normal compilation of the remainder of the source code (112) until another access (206) of a field is encountered. Alternatively, the compiler may, upon generating the error (208), cease or pause compilation for further user input. A user may, upon receiving such an error, cancel the remaining the compilation to address the portion of source code attempting access to a restricted field or may instruct the compiler (106) to continue the compilation.

If not all allocations in the source code (112) of the field are allocations in the restricted memory type, the method of FIG. 2 continues by determining whether at least one but less than every allocation in the source code (112) of the field is an allocation in the restricted memory type. If no allocation of the field is an allocation in the restricted memory type, the method of FIG. 2 continues (204) compiling the source code (112) in a normal fashion until encountering another access of a field (206). If at least one but less than every allocation in the source code (112) of the field is an allocation in the restricted memory type, the method of FIG. 2 continues by generating (206) computer program instructions of the executable application (110) that execute upon each attempted access of the field. The generated instructions, when executed, determine whether the field is currently allocated in the particular memory type and deny access to the field if the field is currently allocated in the particular memory type. That is, the compiler (106) generates and inserts a module of run-time code at each access to the restricted field to determine whether the restricted field is presently allocated in the restricted memory type.

Figure 3:
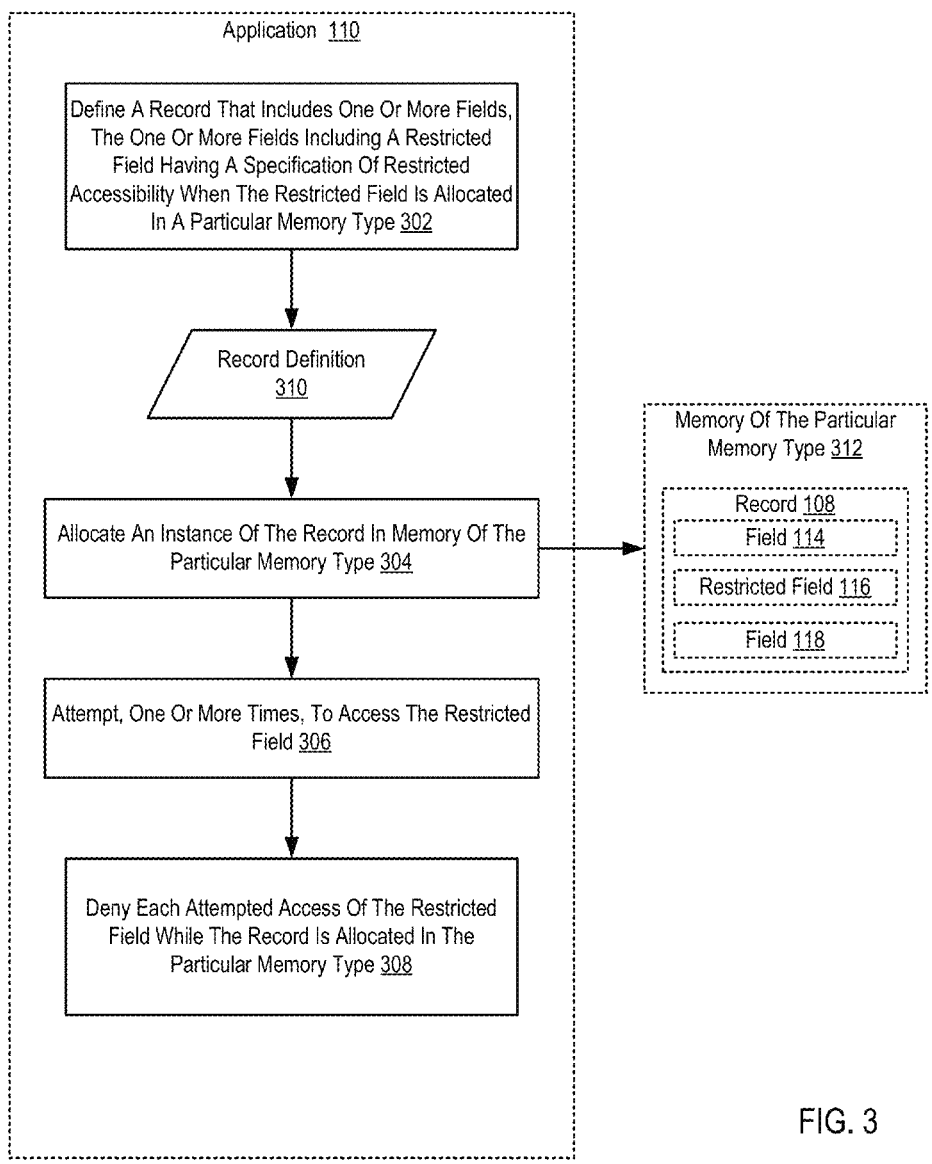
FIG. 3 sets forth a flow chart illustrating an exemplary method for access control of a field of a record in computer memory of a computing system.

For further explanation, FIG. 3 sets forth a flow chart illustrating an exemplary method for access control of a field of a record in computer memory of a computing system. The method of FIG. 3 is carried out by an application—an application compiled in accordance with the method of FIG. 2. The application (110) executes on a computing system that includes computer memory of a number of disparate memory types. The computer memory may be implemented as one or more modules of persistent non-volatile, addressable memory, such as PCM, and one or more modules of volatile RAM.

The method of FIG. 3 includes defining (302), by the application (110), a record (108). The record in the example of FIG. 2 may be implemented in a variety ways including, for example, as a struct or union in a C-type programming language context. The record (108) includes one or more fields (114, 116, and 118). At least one of the fields is a restricted field (116) having a specification of restricted accessibility when the restricted field is allocated in a particular memory type (312).

The method of FIG. 3 also includes allocating (304), by the application (110), an instance of the record (108) in memory of the particular memory type (312). Allocating (304) an instance of the record (108) in memory of the particular memory type (312) may be carried out by executing, for each field of the record, a function call to allocate the field in memory. The function call to allocate the restricted field may be a memory type-specific function call such as mallocPCM.

The method of FIG. 3 also includes attempting, one or more times, to access the restricted field (306). Accessing the restricted field may be carried out in a variety of ways include storing a value in the field, modifying a value in the field, and so on as will occur to readers of skill in the art. While the record is allocated in the particular memory type, the method of FIG. 3 also includes denying (308), by the application (110), each attempted access (306) of the restricted field (116).

Denying (308) each attempted access (306) of the restricted field (116) may be carried out in various ways including, for example, halting or pausing execution of the application (110), logging or generating an error, providing a notification to the user of the denied access and so on. In some embodiments denying each attempted access is carried out for each access attempt by determining whether the field is currently allocated in the particular memory type (312) and denying access to the field if the field is currently allocated in the particular memory type.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of access control of a field of a record in computer memory of a computing system, the computer memory of the computing system comprising a plurality of disparate memory types, the method comprising:
    defining, by an application, a record, the record comprising one or more fields, the one or more fields including a restricted field having a specification of restricted accessibility when the restricted field is allocated in a particular memory type;
    allocating, by the application, an instance of the record in memory of the particular memory type; and
    while the record is allocated in the particular memory type, denying, by the application, each attempted access of the restricted field.

2. The method of claim 1, wherein allocating an instance of the record in memory of the particular memory type further comprises executing, for each field of the record, a function call to allocate the field in memory, the function call to allocate the restricted field comprising a memory type-specific function call.

3. The method of claim 1, wherein the computer memory comprises one or more modules of persistent non-volatile, addressable memory and one or more modules of volatile random access memory ('RAM').

4. The method of claim 1, wherein the persistent non-volatile, addressable memory comprises Phase Change Memory ('PCM').

5. The method of claim 1, wherein the record comprises one of a union, a struct, a class, or an object.

6. An apparatus for access control of a field of a record in computer memory of a computing system, the computer memory of the computing system comprising a plurality of disparate memory types, the apparatus comprising a computer processor, a computer memory operatively coupled to the computer processor, the computer memory having disposed within it computer program instructions that, when executed by the computer processor, cause the apparatus to carry out the steps of:
    defining, by an application, a record, the record comprising one or more fields, the one or more fields including a restricted field having a specification of restricted accessibility when the restricted field is allocated in a particular memory type;
    allocating, by the application, an instance of the record in memory of the particular memory type; and
    while the record is allocated in the particular memory type, denying, by the application, each attempted access of the restricted field.

7. The apparatus of claim 6, wherein allocating an instance of the record in memory of the particular memory type further comprises executing, for each field of the record, a function call to allocate the field in memory, the function call to allocate the restricted field comprising a memory type-specific function call.

8. The apparatus of claim 6, wherein the computer memory comprises one or more modules of persistent non-volatile, addressable memory and one or more modules of volatile random access memory ('RAM').

9. The apparatus of claim 6, wherein the persistent non-volatile, addressable memory comprises Phase Change Memory ('PCM').

10. The apparatus of claim 6, wherein the record comprises one of a union, a struct, a class, or an object.

11. A computer program product for access control of a field of a record in computer memory of a computing system, the computer memory of the computing system comprising a plurality of disparate memory types, the computer program product disposed upon a non-transitory, computer readable medium, the computer program product comprising computer program instructions that, when executed, cause a computer to carry out the steps of:
    defining, by an application, a record, the record comprising one or more fields, the one or more fields including a restricted field having a specification of restricted accessibility when the restricted field is allocated in a particular memory type;
    allocating, by the application, an instance of the record in memory of the particular memory type; and
    while the record is allocated in the particular memory type, denying, by the application, each attempted access of the restricted field.

12. The computer program product of claim 11, wherein allocating an instance of the record in memory of the particular memory type further comprises executing, for each field of the record, a function call to allocate the field in memory, the function call to allocate the restricted field comprising a memory type-specific function call.

13. The computer program product of claim 11, wherein the computer memory comprises one or more modules of persistent non-volatile, addressable memory and one or more modules of volatile random access memory ('RAM').

14. The computer program product of claim 11, wherein the persistent non-volatile, addressable memory comprises Phase Change Memory ('PCM').

15. The computer program product of claim 11, wherein the record comprises one of a union, a struct, a class, or an object.

16. The computer program product of claim 11 wherein the computer readable medium comprises a storage medium.

17. A method of compiling source code configured for access control of a field of a record in computer memory, the computer memory comprising a plurality of disparate memory types, the method comprising:

during compilation of the source code into an executable application:

determining, for each access of a field of a record, whether the field was defined as having a specification of restricted accessibility when the field is allocated in a particular memory type;

if the field was defined as having a specification of restricted accessibility when the field is allocated in the particular memory type:

generating, when all allocations in the source code of the field comprise allocations in the restricted memory type, an error indicating one or more attempted accesses of a restricted field; and generating, when at least one but less than every allocation in the source code of the field comprises an allocation in the restricted memory type, computer program instructions of the executable application that execute upon each attempted access of the field and carry out the steps of: determining whether the field is currently allocated in the particular memory type and denying access to the field if the field is currently allocated in the particular memory type.

18. The method of claim 17, wherein the computer memory comprises one or more modules of persistent non-volatile, addressable memory and one or more modules of volatile random access memory ('RAM').

19. The method of claim 17, wherein a source code allocation of a field in the particular memory type comprises a memory type-specific function call to allocate the field in the particular memory type.

* * * * *